Nov. 26, 1935.　　　C. E. LUCKE　　　2,022,427
FUEL BURNING APPARATUS
Filed Nov. 14, 1930　　6 Sheets-Sheet 3

Nov. 26, 1935.   C. E. LUCKE   2,022,427
FUEL BURNING APPARATUS
Filed Nov. 14, 1930   6 Sheets-Sheet 4

Patented Nov. 26, 1935

2,022,427

UNITED STATES PATENT OFFICE 2,022,427

FUEL BURNING APPARATUS

Charles E. Lucke, New York, N. Y., assignor to Fuller Lehigh Company, Fullerton, Pa., a corporation of Delaware Application November 14, 1930, Serial No. 495,562

4 Claims. (Cl. 110—28)

This invention relates to a fuel burner for burning fuel, such as pulverized coal, in two stages, one of which is in a casing into which hot secondary air is introduced, and the other is in the furnace proper.

Figure 1:
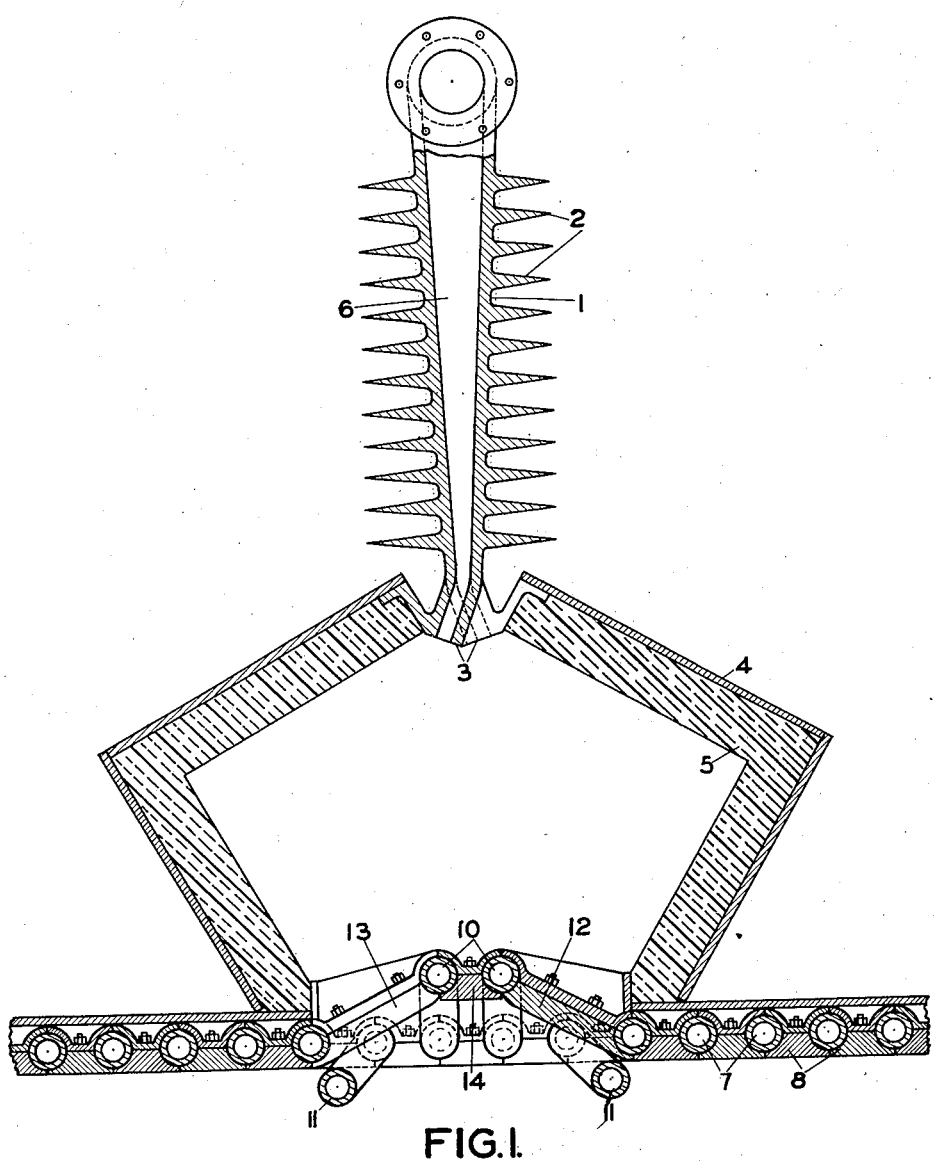
Figure 2:
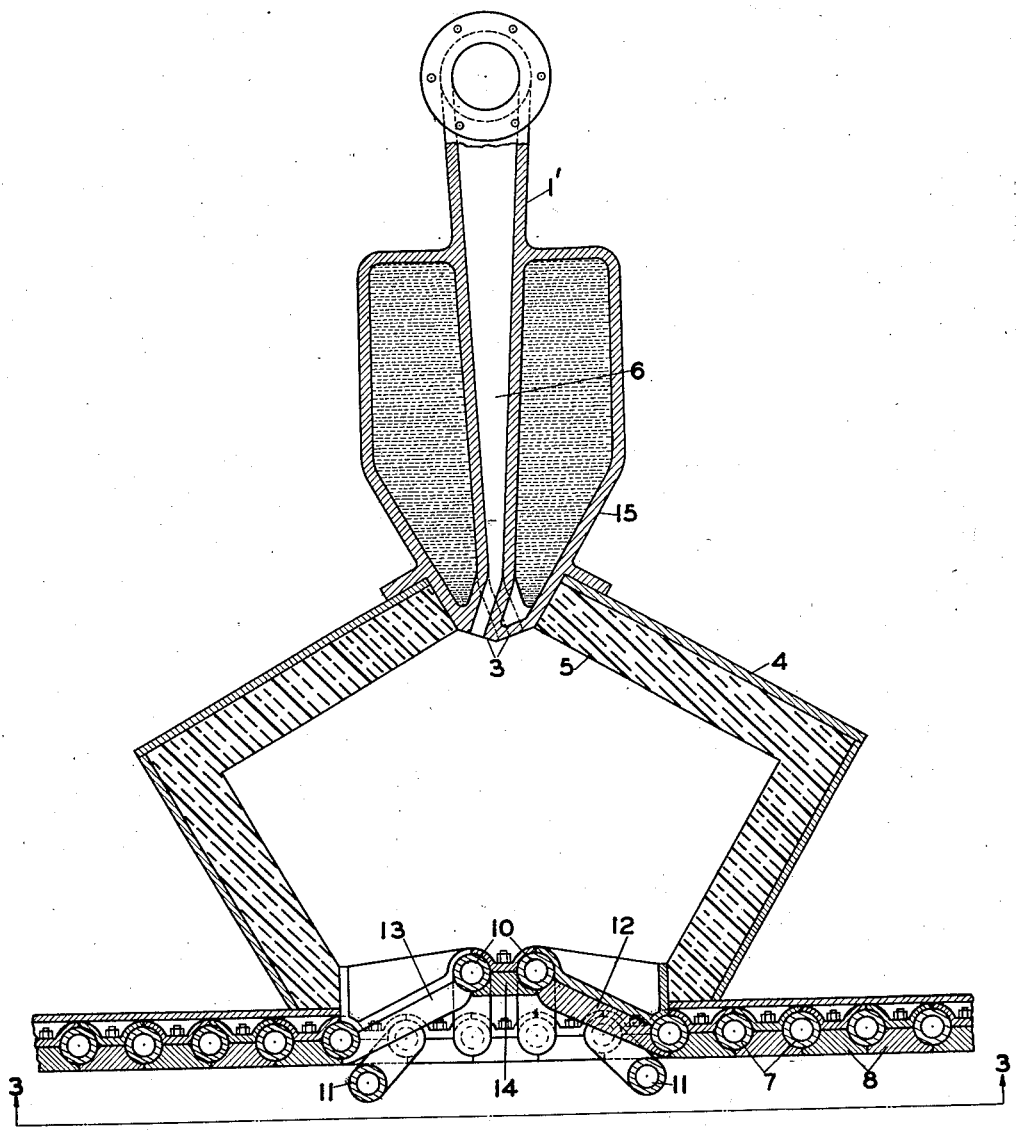
Figure 3:
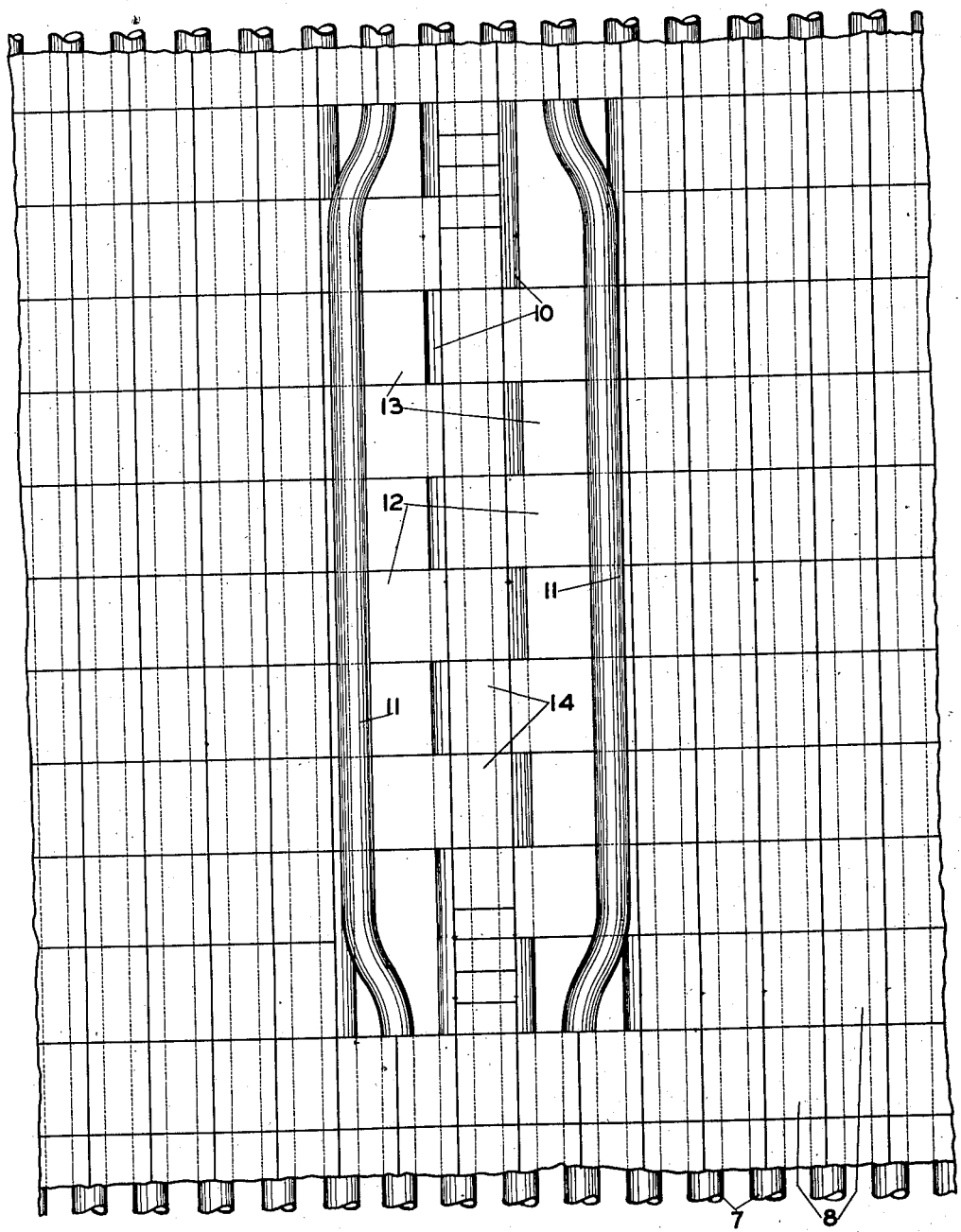
Figure 4:
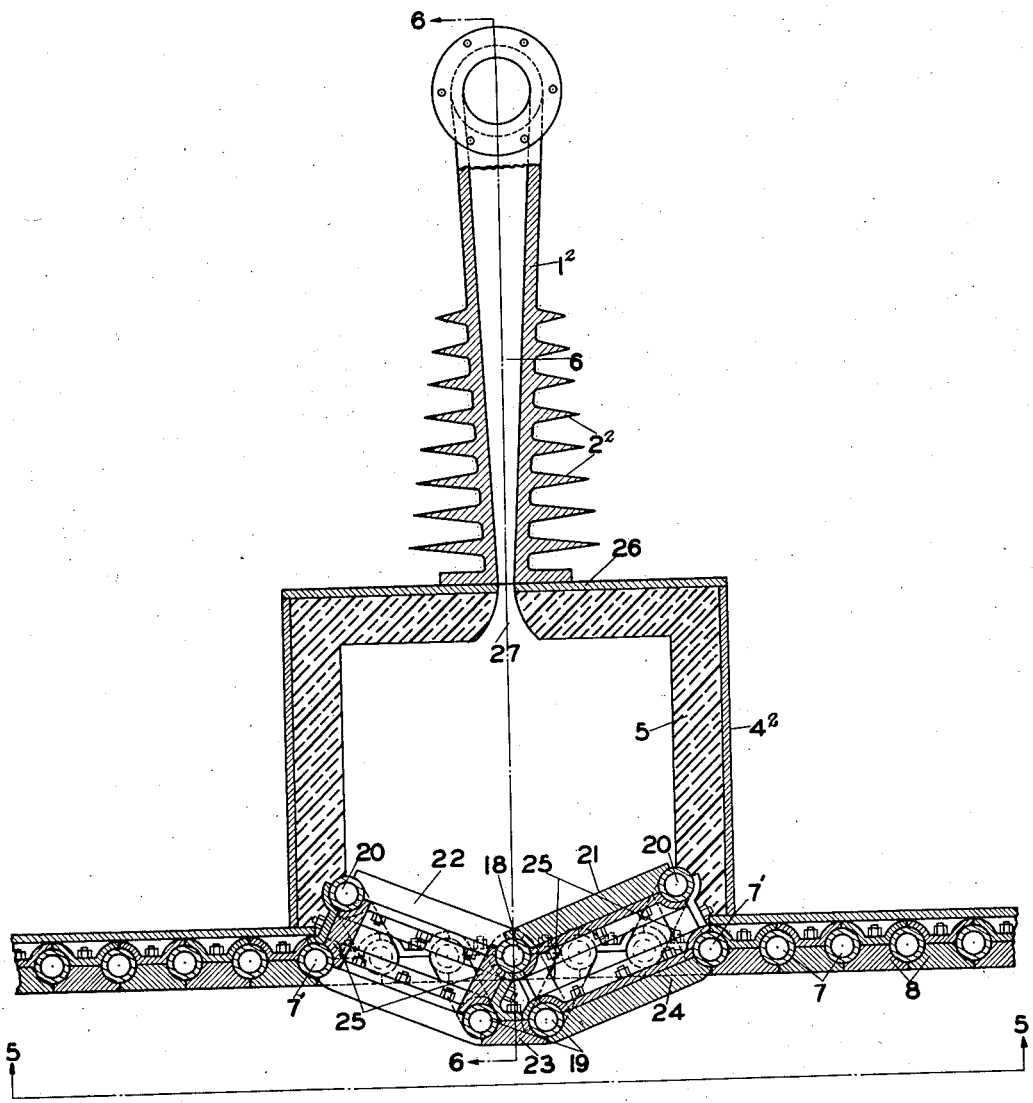
Figure 5:
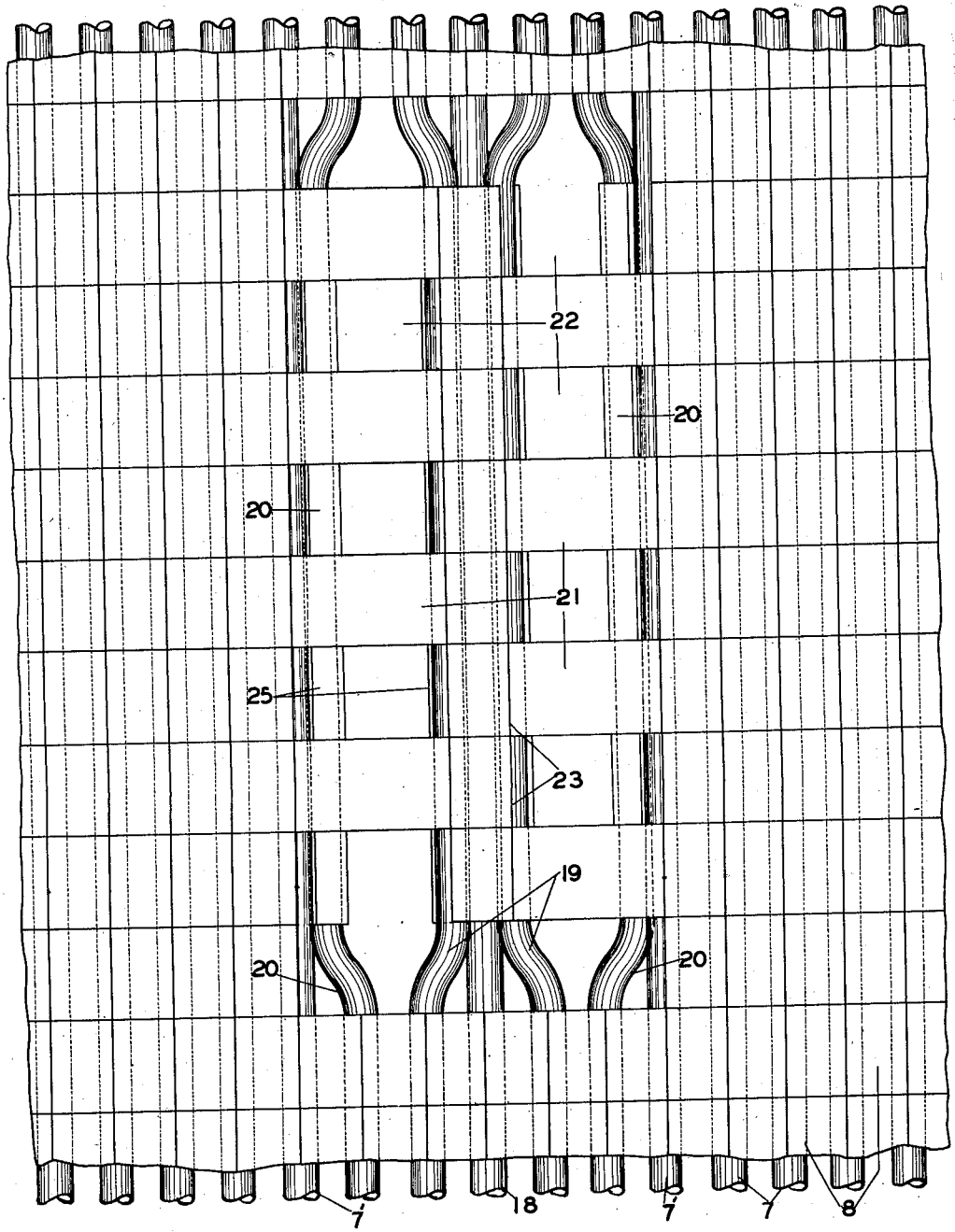
Figure 6:
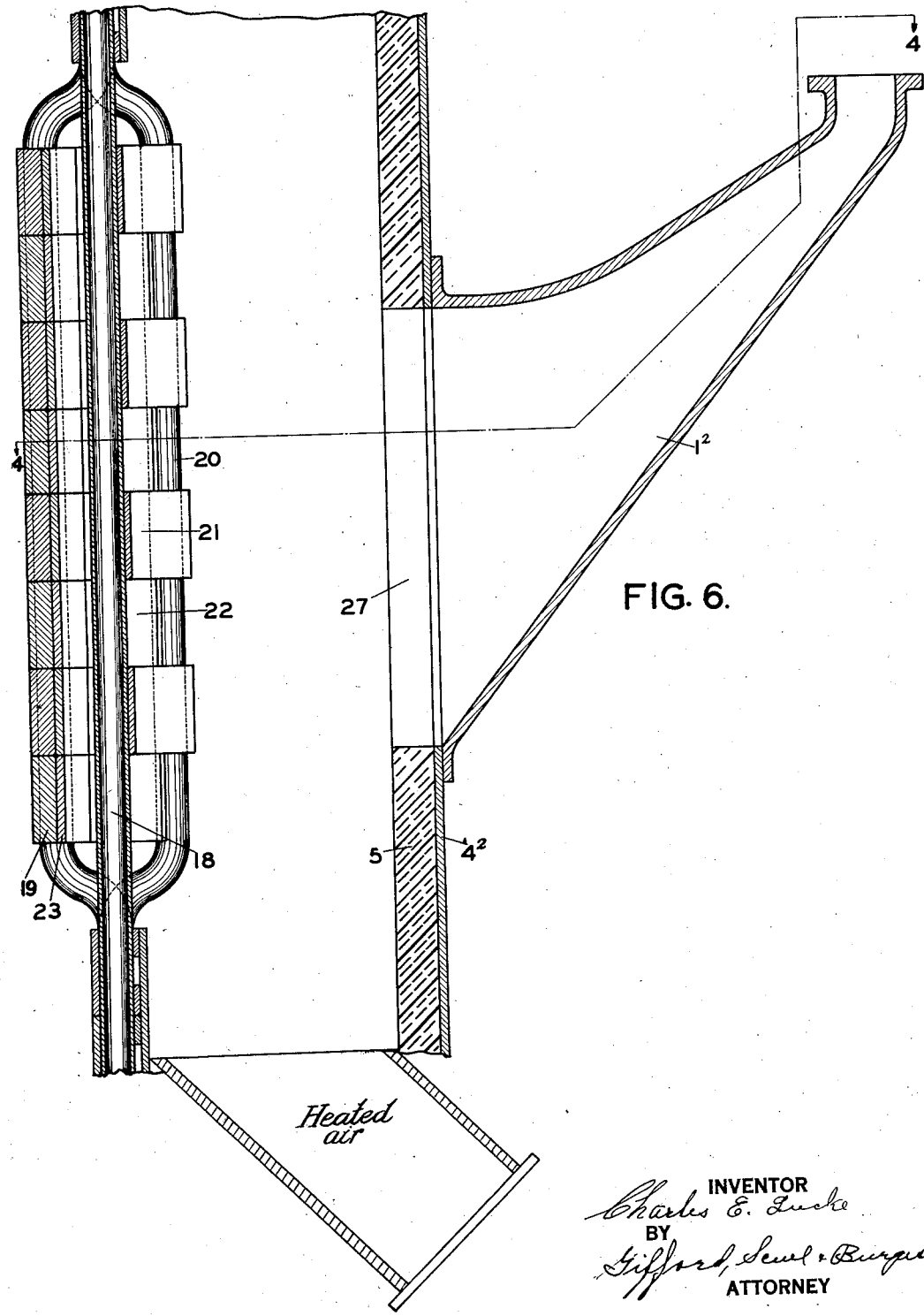

The invention will be understood from the description in connection with the accompanying drawings, in which Fig. 1 is a horizontal section through an illustrative embodiment of a device for carrying out the invention; Fig. 2 is a similar section showing a modification; Fig. 3 is a view from the inside of the furnace taken along the line 3—3 of Fig. 2; Fig. 4 is a horizontal section similar to Figs. 1 and 2 taken along the line 4—4 of Fig. 6, showing another modification; Fig. 5 is a view from the inside of the furnace taken along the line 5—5 of Fig. 4, and Fig. 6 is a section along the line 6—6 of Fig. 4.

In the drawings, reference character 1 indicates a fuel burner of the type that has a wide thin opening therethrough to cause the fuel in suspension and primary air to assume the form of a thin sheet. It is provided with ribs 2 along the outside thereof to increase the rate of radiation of heat therefrom and keep it cool. Lips 3 are provided at the exit end of the nozzle of the burner, these lips being bent alternately to opposite sides to direct streams of fuel and primary air in staggered streams to opposite sides.

The burner 1 projects the fuel and primary air into a secondary air casing or pre-combustion chamber 4, the walls of which are lined with heat-insulating material 5 to protect the outer metal shell. The secondary air casing 4 may be provided with combustion air at a sufficiently high temperature to cause ignition of the fuel that enters the casing 4 from the burner 1. In the embodiments of the invention illustrated in Figs. 1 and 2, the outer walls of the secondary air casing 4 are disposed at an oblique angle to the burner 1 and the inner walls are substantially at right-angles to the outer walls and are located at an oblique angle to the wall of the side of the furnace which the fuel enters.

The fuel and primary air passing through the wide thin opening 6 of the burner 1 enter the casing 4 in different directions at different elevations along the opening 6 as portions of the wide stream are diverted by the oppositely inclined lips 3 at the exit of the burner 1.

The furnace which the fuel enters from the secondary air casing 4 is provided with a wall comprising a row of water wall tubes 7 lined with tile or blocks 8. The size or volume of the pre-combustion chamber is smaller than that of the furnace, as shown in Figs. 1, 2 and 4. Two of the water tubes near the center line of the burner 1 are bent outwardly as indicated at 10, and the two water tubes next to them are bent inwardly as indicated at 11. Spaced blocks or tile 12 are installed between each tube 10 and the adjacent tube 7, the blocks on opposite sides of the pair of tubes 10 being staggered so that staggered ports 13 are provided on opposite sides of the pair of tubes 10 from the casing 4 into the furnace. The tubes 11 being bent as indicated, leave wide spaces and are also in position to aid in guiding the staggered streams of fuel and air into the furnace, so that they cross each other. A row of blocks or tile 14 is connected to the tubes 10 to close the space between them.

The fuel and primary air enter the secondary air casing 4 and when the secondary air is at the ignition temperature, ignition begins in this casing and is completed after the products pass through the ports 13 between the blocks or tile 12. The secondary air is heated in any known or convenient manner (not illustrated) and is carried into the pre-combustion chamber from below as illustrated in Figure 6.

In the modification shown in Fig. 2, the burner $1^1$ is surrounded by a water jacket 15 and is kept cool by means of the water in this jacket, the remainder of the elements shown in this modification being the same as those already described.

In the modification shown in Figs. 4, 5 and 6, a single tube 18 is left in place in the wall of the furnace along the center line of the burner $1^2$ and a tube 19 on each side of the tube 18 is bent inwardly as indicated, with the next tubes 20 on each side bent outwardly as indicated. Spaced blocks 21 are installed between the tubes 18 and 20 on each side so as to leave staggered ports 22 on opposite sides of the tube 18 from the casing $4^2$ into the furnace.

A row of blocks 23 is installed along the tubes 19 to close the space between them.

Spaced blocks or tile 24 corresponding to the blocks or tile 21 are installed between the tubes 19 and the first unbent tube 7' in the row of furnace wall tubes and a block or tile 25 is installed between the tubes 18 and 19 at one side of each port 22 and the tubes 20 and 7' at the other side of the port, thus forming the side walls of the ports 22.

In the modification shown in Figs. 4, 5 and 6, the outer wall 26 of the casing $4^2$ is perpendicular to the burner $1^2$ and is provided with an opening 27 through which the fuel and primary air enter the casing $4^2$. The ports 22 are so disposed that the products passing from the casing 4² into the furnace enter the furnace along diverging staggered streams instead of converging streams as described in the other modification.

The fuel burners or nozzles in any of the embodiments of the invention may be cooled either by means of the ribs in air or water jackets may be used. The bent lips 3 in Figs. 1 and 2 prevent radiant heat from entering the nozzle, and since the radiant heat from the furnace in Fig. 3 enters the secondary air casing at an angle, it cannot pass into the fuel nozzle.

I claim:

1. In combination, a furnace wall having a vertical series of staggered ports therein, refractory walls forming an external pre-combustion chamber having one side thereof registering with said furnace wall ports, an opening formed in one of said chamber walls for the entry of high temperature air for combustion, and an elongated fuel burner nozzle arranged to discharge into said chamber through a chamber wall spaced from said furnace wall and having a vertical series of staggered diverging discharge tips corresponding in elevation to said furnace wall ports.

2. In combination, a furnace wall having a row of spaced cooling tubes associated therewith and refractory material arranged to close the intertube spaces, certain of said cooling tubes having refractory material omitted from therebetween to form a restricted port in said furnace wall, refractory walls forming an external pre-combustion chamber having one side thereof registering with said furnace wall port, an opening formed in one of said chamber walls for the entry of high temperature air for combustion, and a fuel burner nozzle arranged to discharge into said chamber through a chamber wall spaced from said furnace wall.

3. In combination, a wall having a row of spaced cooling tubes associated therewith, and refractory material arranged to close the intertube spaces, certain of said cooling tubes being bent and refractory material omitted from therebetween to form a vertical series of staggered ports in said furnace wall, refractory walls forming an external pre-combustion chamber having one side thereof registering with said furnace wall ports, an opening formed in one of said chamber walls for the entry of high temperature air for combustion, and an elongated fuel burner nozzle arranged to discharge into said chamber through a chamber wall spaced from said furnace wall and having a vertical series of staggered diverging discharge tips corresponding in elevation to said furnace wall ports and arranged out of the direct path of heat radiated from the furnace through said furnace wall ports.

4. In combination, a substantially vertical furnace wall having a row of spaced substantially vertical cooling tubes associated therewith, and refractory material arranged to close the intertube spaces, certain of said cooling tubes being bent and refractory material omitted from therebetween to form a vertical series of staggered ports in said furnace wall, refractory walls forming a pre-combustion chamber having one side thereof registering with said furnace wall ports, an opening formed in one of said chamber walls for the entry of high temperature air for combustion, a vertically elongated fuel burner nozzle arranged to discharge into said chamber through the chamber wall opposite said furnace wall and having a vertical series of staggered diverging discharge tips corresponding in elevation to said furnace wall ports and arranged out of the direct path of heat radiated from the furnace through said furnace wall ports, and means for cooling said fuel burner nozzle.

CHARLES E. LUCKE.